Jan. 8, 1924.

J. B. BROADWELL 1,480,498

BOLL WEEVIL DESTROYER

Filed April 21, 1921

Inventor
John B. Broadwell

By
[signature]
Attorney

Jan. 8, 1924.  
J. B. BROADWELL  
BOLL WEEVIL DESTROYER  
Filed April 21, 1921  
1,480,498  
5 Sheets-Sheet 4
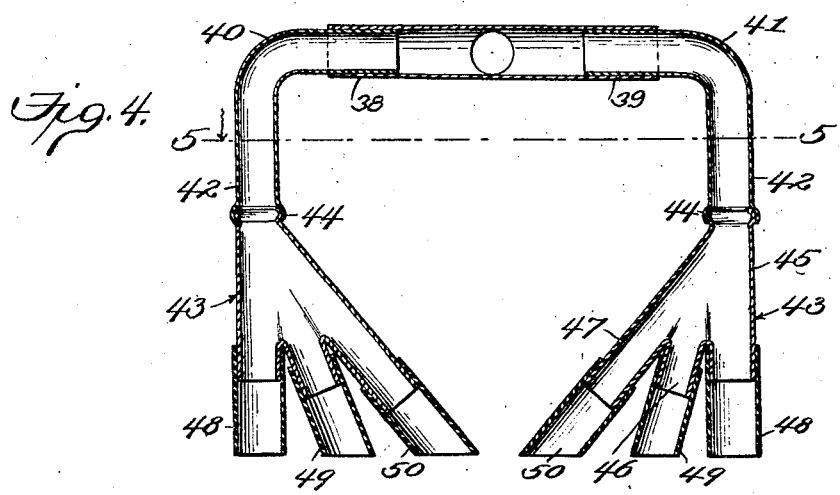
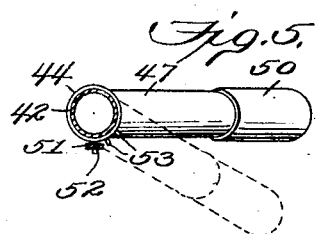
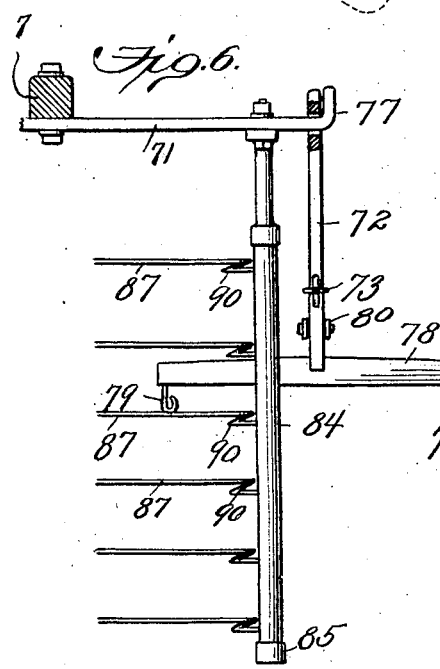
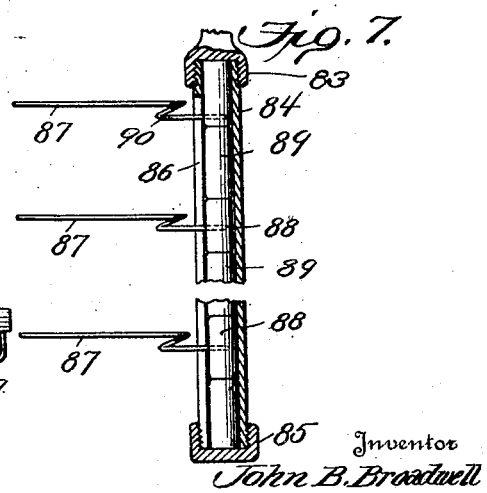
Inventor  
John B. Broadwell  
By   
Attorney Jan. 8, 1924.
J. B. BROADWELL
1,480,498
BOLL WEEVIL DESTROYER
Filed April 21, 1921
5 Sheets-Sheet 5
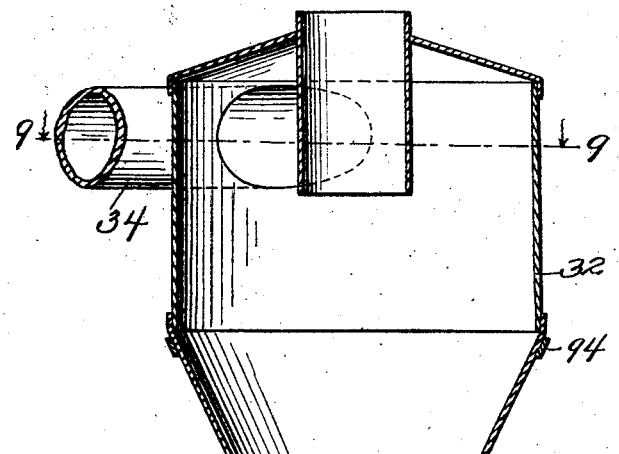
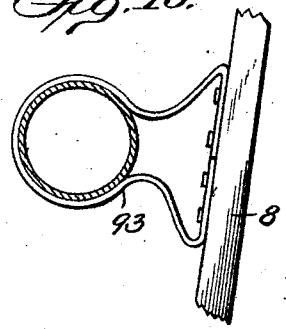
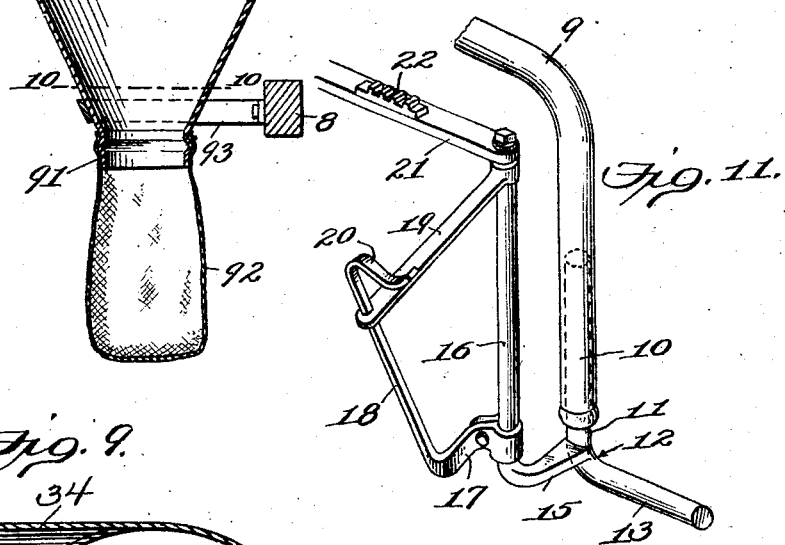
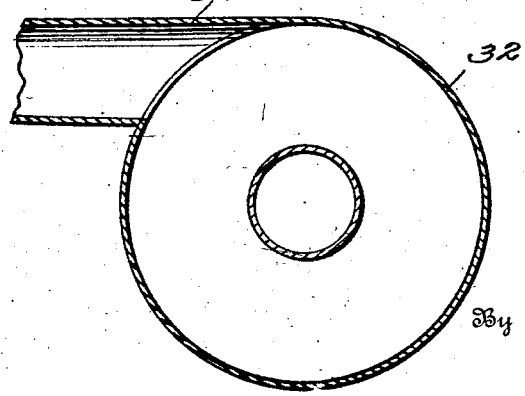
Inventor
John B. Broadwell
By
Attorney Patented Jan. 8, 1924.

1,480,498

UNITED STATES PATENT OFFICE.

JOHN B. BROADWELL, OF ALPHARETTA, GEORGIA.

BOLL-WEEVIL DESTROYER.

Application filed April 21, 1921. Serial No. 463,143.

*To all whom it may concern:*

Be it known that I, JOHN B. BROADWELL, a citizen of the United States, residing at Alpharetta, in the county of Milton and State of Georgia, have invented new and useful Improvements in Boll-Weevil Destroyers, of which the following is a specification.

This invention relates to an improved machine for destroying boll weevil and the primary object of the same is to provide a machine of this class which may be readily operated to brush off weevil from all affected squares and cause the weevil to be thrown to the ground and afterwards picked up by suction and gathered in bulk for easy destruction. A further object of the invention is to provide a machine of this class having adjustable features to adapt the machine to rows of various widths, and also other features to facilitate the guidance and general operation of the mechanism comprised in the machine.

With these and other objects and advantages in view, the invention consists in the construction and arrangement of the several parts which will be more fully hereinafter described and claimed.

In the drawings:

Fig. 4 is a detail section taken through the gathering tubes.

Fig. 5 is a horizontal section taken in the plane of the line 5—5, Fig. 4.

Fig. 6 is a detail elevation of a part of the draft mechanism, showing the draft tongue in section and particularly illustrating the preferred form of means for removing the weevil from the cotton stalks.

Fig. 7 is an enlarged transverse vertical broken section through a portion of the weevil-removing means.

Fig. 8 is a transverse vertical section through a receiver where the weevils are separated from the air, and also illustrating a portion of one of the pipes, a supporting means, and a gathering or collecting sack.

Fig. 9 is a horizontal section taken on the line 9—9, Fig. 8.

Fig. 10 is a horizontal section on the line 10—10, Fig. 8.

Fig. 11 is a detail perspective view of a part of the steering mechanism.

Figure 1:
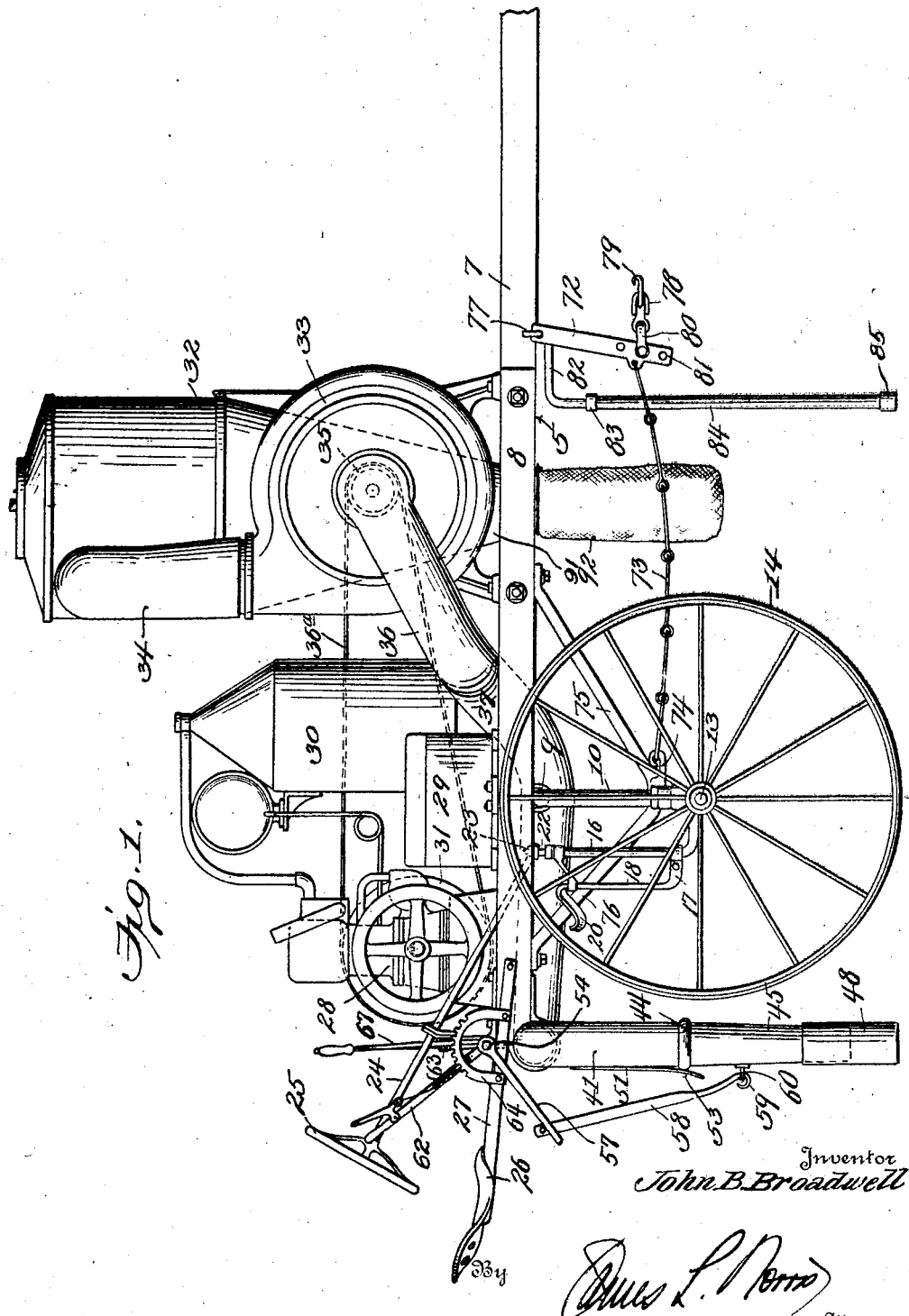
Fig. 1 is a side elevation of a machine embodying the features of the invention.
Figure 2:
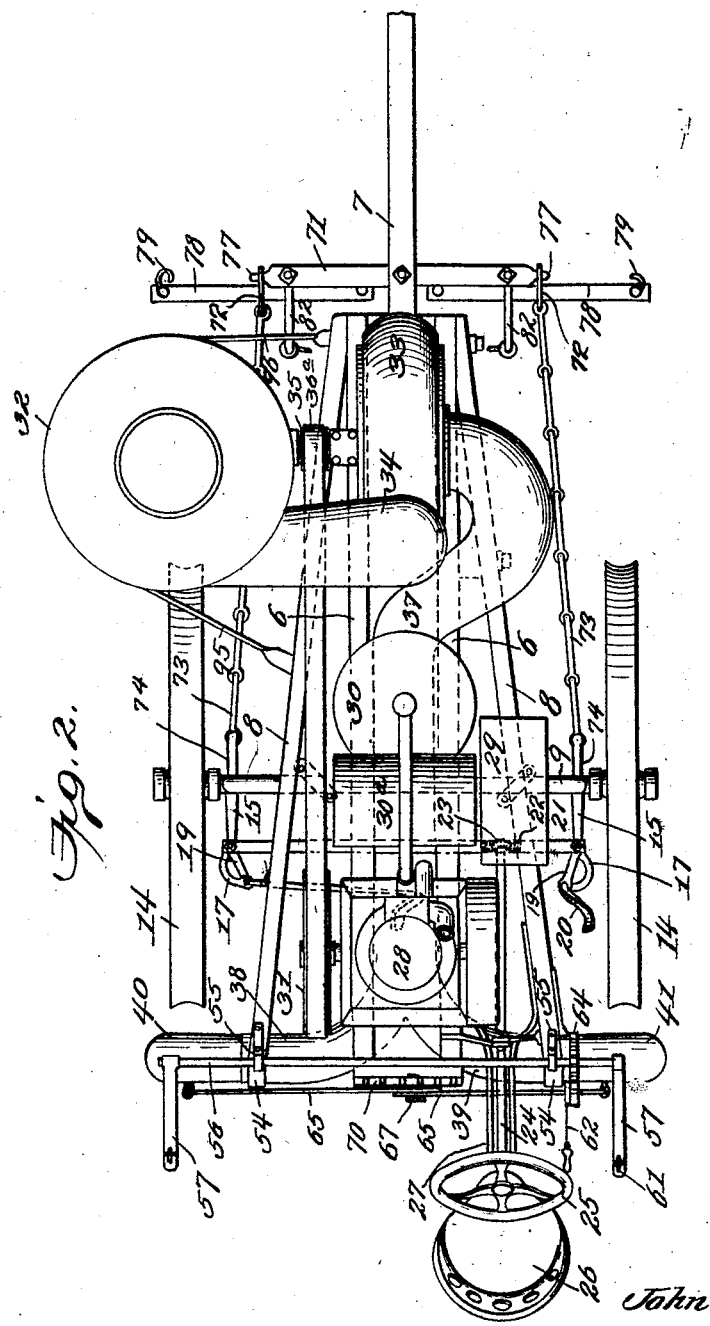
Fig. 2 is a top plan view of the improved machine with the shifting lever, for parts of the gathering devices, in section.
Figure 3:
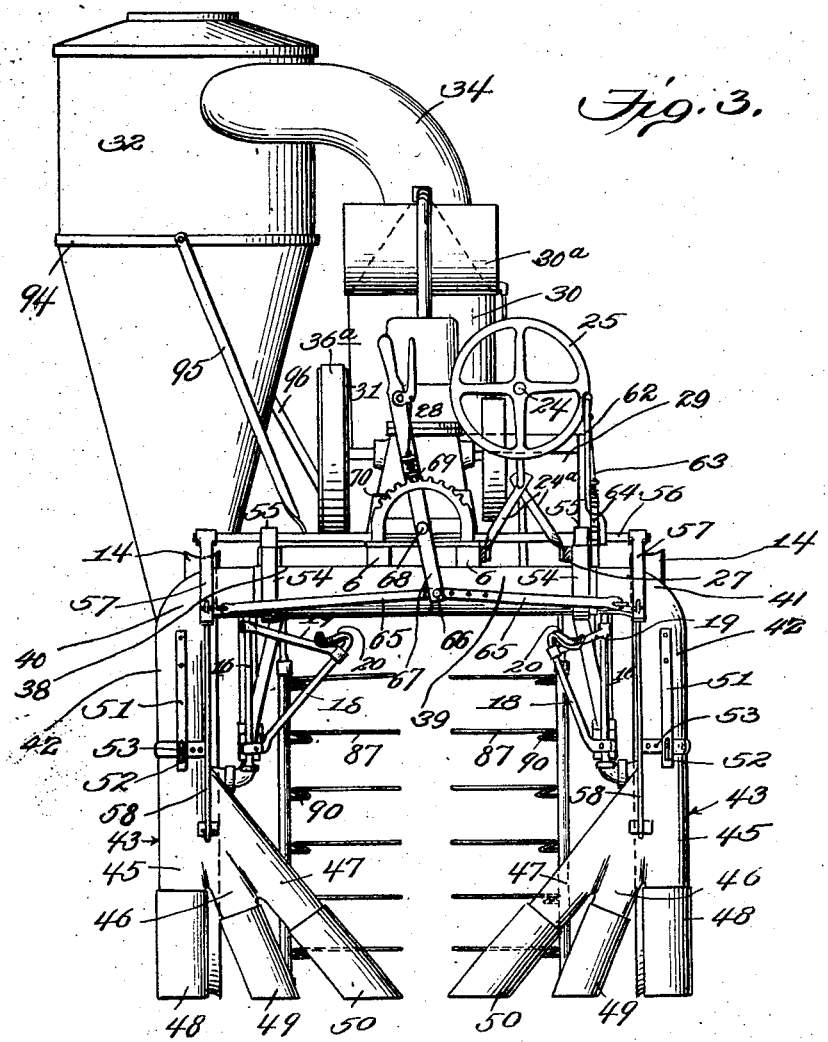
Fig. 3 is a rear end elevation.

The numeral 5 designates a frame preferably composed of intermediate side beams or members 6 connected at their front ends to a draft tongue 7 and also having rearwardly extending divergent brace beams or members 8. An arched axle 9 is secured to and extends transversely under the intermediate portion of the frame and has depending or vertical tubular extremities 10 in which upright arms 11 of wheel carriers 12 are rotatably mounted, as shown by Fig. 11, said carriers having wheels 14 of any suitable structure mounted to rotate thereon, as shown by Figs. 1 and 2. Welded or otherwise secured to a point adjacent to the bend of each of the wheel carriers 12 is a horizontal rearwardly projecting foot 15 continuing from, or forming a part of, an upright steering rod 16 having a lower clamp 17 of a foot steering post 18 secured thereto. The post 18 projects upwardly through a rearwardly projecting crank arm 19 which is secured to the upper portion of the rod 16. The upper end of the foot steering post 18 is bent into the form of a stirrup 20 for receiving the foot of the operator; and the forward end of the crank arm 19 is secured with the rod 16 to the outer end of the transversely extending horizontally disposed steering bar 21 having gear teeth 22 on the upper side thereof which are engaged by a gear or pinion 23 on the forward end of a steering rod or post 24 disposed at a downward angle of inclination and having a hand or steering wheel 25 on the rear uppermost end thereof adjacent to or over a driver or operator's seat 26 secured on a seat support 27 attached to the rear part of the frame. The rod or post 24 is held in position by cross braces 24ª secured to the frame below. The steering rod 16, post 18 and crank arm 19 are disposed at opposite sides of the machine, so that the wheels 14 may be turned to guide the machine either to the right or left during its progress as may be found necessary in following rows of cotton stalks or in making turns, and the steering mechanism as specified may be either operated through the hand wheel 25 or the foot stirrups 20. The steering mechanism as explained is easily operated or is sensitive in its actuation so as to render the machine readily controllable during its progress.

Suitably mounted on the rear part of the frame is a motor 28 of any preferred construction and having the usual battery equipment 29 and water supply tank 30 suitably connected to the circulating pump of the motor. A fuel tank 30ª is supported at the rear upper portion of the water tank 30, and the motor 28 is provided with a driving wheel 31. On the forward portion of the frame is a cyclone separator 32 of well known construction and provided with a combined suction and blower fan 33 having a delivery pipe 34 communicating with the upper portion thereof. On the shaft of the combined suction and fan and blower is a pulley 35 from which a belt 36ª extends to and surrounds the driving wheel 31 and by means of which the fan and blower is operated. The fan and blower has a suction pipe 36 extending downwardly and rearwardly therefrom between the frame members, said pipe being bent inwardly, as at 37, (see Fig. 2) to dispose the same centrally with relation to the frame members. The rear end of the suction pipe 36 has divergent transversely disposed cross pipes 38 and 39 extending therefrom, and in the outer ends of the said cross pipes suction elbow pipes 40 and 41 are mounted and formed with vertically depending members 42 having rotatable tubular extremities 43 jointed thereto, as at 44, the extremities 43 each comprising a vertical member 45 and angularly disposed or divergent members or branches 46 and 47. The members 45, 46 and 47 are all shiftable as a unit, or have uniform rotation or adjustment and their angles may be modified by turning the same so as to bring them nearer together or farther apart relatively to the longitudinal center of the machine to accommodate rows of different widths and also to dispose the said gathering members 45, 46 and 47 in such positions relatively to the ground surface that different areas may be operatively covered or affected thereby. On the lower ends of the gathering members 45, 46 and 47 are yielding or rubber boots 48, 49 and 50 which serve as ground-engaging extensions for the said branches and permit a close yielding contact with the ground surface to insure gathering operation relatively to the weevils which are forced from the cotton stalks and fall upon the ground surface. Depending from the rear portion of each elbow member is a flat spring catch or locking means 51 having an opening or slot 52 in its lower free extremity to engage any one of a series of projections 53 on the outer surface of the joint 44, and whereby the members 45, 47 and 46 as a unit may be adjusted and held fixed in their adjusted positions. Strap hangers 54 are secured to and project rearwardly from the frame 5, and in these hangers the divergent suction pipes 38 and 39 are mounted and held positively associated with the frame in operative position. In suitable bearings 55 mounted on the rear ends of the divergent brace beams or members 8 a transversely extending adjustable rod or shaft 56 has rotatable movement, said rod or shaft being provided with rearwardly projecting crank arms 57 attached by depending coupling bars 58 to the gathering members 45, 46 and 47 at a point adjacent to the divergence of said members. The lower end of each coupling bar 58 has an eye 59 loosely engaging an eye 60 at an angle thereto and secured to the gathering members, and the upper end of each coupling bar extends through a slot 61 in the rear end of its corresponding crank arm 57. By this means sufficient lateral play or movement is provided for each coupling bar 58 to accommodate lateral adjustment of the elbows 40 and 41 and the gathering extremities 45, 46 and 47 in a manner which will be presently explained. The crank arms 57 of the rod or shaft 56 when the gathering extremities are in lowered operative positions normally extend downwardly at an angle, as shown by Fig. 1, and when the said rod or shaft 56 is turned forwardly, the elbows 40 and 41 and the gathering extremities 45, 46 and 47 are elevated as a unit in accordance with the movement of tne said rod or shaft. To move or rotate the rod or shaft 56, an operating lever or arm 62 is secured thereto and provided with a catch device 63 to cooperate with a toothed segment 64 secured on the outer side of the rear end of one of the brace beams or members 8 for positively holding the elbows 40 and 41 and the gathering extremities 45, 46 and 47 in their adjusted positions. The inwardly projecting horizontal members or arms of the elbows 40 and 41 are free to turn in the outer ends of the divergent suction pipe members 38 and 39, and said elbow members are also telescopically fitted in the suction pipe ends and are adapted to be moved inwardly and outwardly predetermined distances, and each elbow has the outer end of a link bar 65 loosely connected thereto, the two bars extending inwardly and adjustably overlapping and connected by an adjusting bolt 66 and also attached to the lower end of a shifting lever 67 which is fulcrumed, as at 68, on the rear extremity of a part of the frame and has a catch dog 69 to engage a toothed segment 70 for holding the elbows 40 and 41 and the gathering members 45, 46 and 47 in laterally spaced relation the distance required to effectively cover the ground surface between the rows of cotton stalks. By laterally shifting the lever 67 in opposite directions, stresses are exerted on the links 65 and the elbows 40 and 41 and gathering extremities 45, 46 and 47 correspondingly moved. It will therefore be seen that the gathering extremities 45, 46 and 47 and the elbows 40 and 41, constituting the adjustable units of the suction pipe system, may be moved either upwardly or downwardly, outwardly or inwardly, and also in part rotated at an angle to bring the boots inwardly in relatively close positions, or moved outwardly to maximum adjusted positions or at different points between the two extreme adjustments, with material advantages in fully covering and operating upon the ground surface traversed between the rows of cotton stalks and insure a thorough gathering of the weevil that have been struck or removed from the cotton stalks.

Extending transversely beneath and secured to the draft tongue 7 a short distance in advance of the front terminal of the frame 5 is a draft bar 71 having draft links 72 movably attached at their upper ends thereto and depending below the said bar a predetermined distance, each draft link having a draft chain or flexible attaching means 73 connected thereto and extending rearward and attached to a hook 74 fixed to or forming a part of depending draft braces 75 and 76, which are attached at their upper ends to the frame 5. The upper ends of the links 72 are connected by means of hooks 77 to the opposite ends of the bar 71, and adjustably attached to each link is a singletree 78 provided with the usual trace hooks 79 for hitching draft animals to the machine. By adjusting the singletree 78 relatively to the links 72, the line of draft may be modified, as will be readily understood, the said singletree being preferably connected by a clevis 80 to the link 72 and the latter having a plurality of openings 81 therein to permit the adjustment of the singletree as may be found desirable or necessary. At a suitable distance inwardly from each end of the draft bar 71 an angular connector 82 is attached and has a lower screw cap or coupling head 83 for operable attachment to the upper screw-threaded extremity of a tubular pendant 84, shown on an enlarged scale by Fig. 7, the said pendant also having a lower screw-threaded end to receive a removable cap 85. The inner opposing portions of the pendants 84 are formed with longitudinal slots 86, one slot being formed in each pendant, and projecting inwardly through the slots are spring striker wires 87, having inner free extremities or ends and attached at their outer ends to carrying heads 88 consisting of cylindrical blocks slidably fitted in, and freely removable from, and adapted to be easily replaced in, the said tubular hangers. The heads 88 are preferably separated so as to dispose the spring strikers or arms 87 at proper distances apart by space blocks or members 89, and in assembling the heads 88 with the spring striker arms 87 and the space members 89, the said parts are alternately inserted in the tubular hangers through the lower open ends of the latter and the caps 85 applied, to thereby hold the said heads and space members in assembled relation, as shown by Fig. 7. The spring striker arms 87 are formed with coils 90 adjacent to the heads 88, so as to give the said arms a sensitive resilient action, or to preserve sufficient striking stress in each arm to effect a removal or displacement of the weevil from the cotton stalks and the branches of the latter without injury to the stalks or branches or breakage of the arms. It will be understood that the striker arms will have a substantially sweeping action with relation to the branches of the cotton stalks, and the said arms will extend over far enough to fully engage the stalks on each side of a row which is straddled by the machine, and thereby each row of stalks will be thoroughly treated. At any time desired the spring or resilient striker arms may be detached and replaced relatively to the tubular pendants 84.

The cyclone separator is of well known construction and on the lower outlet extremity 91 thereof the upper end of a reticulated gathering bag 92 is attached, said bag being preferably formed of wire gauze. Into this bag the weevils drawn into the separator are deposited and at intervals the bag may be removed and the weevil destroyed without injury to the bag structure, and subsequently the bag may be replaced or a similar bag substituted therefor.

At such point as may be found necessary, as for instance, in connection with the separator and other components of the machine, braces and strengthening rods will be attached so as to give the machine sufficient rigidity to render the same durable and of a practically serviceable character. If the boots 48, 49 and 50 become worn, they may be replaced by other like devices, and it will be seen that the lower ends of the boots 49 and 50 will be straight to permit them to closely and squarely engage the ground surface. For conveniently holding the lower outlet extremity of the separator 32 in place, a strap loop 93 embraces the same and is secured to one of the adjacent rearwardly diverged beams or frame members 8, the said strap loop being formed as clearly shown by Fig. 10. At a point above the location of this strap loop the separator will also be held by a loop brace 94 surrounding the same and provided with members 95 and 96 extending downwardly and secured to the same beam or frame member to which the strap brace 93 is attached.

The machine in operation straddles a row of cotton stalks and as it progresses the spring arms or beaters 87 strike the various parts of the stalks and knock the weevil therefrom to the ground surface below, and the suction mechanism, including the cyclonic separator 32 and the gathering unit at the rear having tubular connection with said separator by way of the fan and blower 33, are rendered effective by the motor mechanism specified, and the boots 48, 49 and 50 closely engage the ground surface and follow the irregularities of the latter in view of the flexibility thereof, or the boot 48$^a$ and similar boots of each group carrying the follower wheel 48$^f$ and wheels similar to the latter will operate over the ground surface in the same manner, and through these boots and the branches or members, the elbows 40 and 41 and the divergent pipes 38 and 39, the weevils are picked up and drawn through the said gathering parts into the main central pipe 36 and from the latter pass through the fan and blower 33 and thence by way of the pipe 34 into the top portion of the separator, where the air passes out after a cyclonic movement therein and which causes the weevil to fall through the outlet extremity or end 91 of the separator into the bag 92. When the bag 92 becomes filled it may be removed and the weevil destroyed by any suitable method, and the bag subsequently replaced on the lower outlet extremity of the separator. During the progress of the machine and the operation of the gathering and separating devices just explained, the wheels 14 may be readily turned, either by hand or the feet of the operator, to cause the machine to regularly follow or engage over the row of cotton stalks, and, likewise, when the machine is transported to and from the rows of cotton stalks, or in making turns to dispose the machine in position for operation on various rows of stalks, the steering of the machine may be readily effected and controlled.

What I claim as new is:

1. In a machine of the class specified, a wheeled frame, suction mechanism mounted on the frame, and a tubular gathering unit connected to the suction mechanism and comprising laterally and rotatably adjustable divergent extremities adapted to closely engage the ground surface.

2. In a machine of the class specified, a wheeled frame, suction mechanism mounted on the frame, and a tubular gathering unit connected to the suction mechanism and mounted to adjustably swing upwardly and downwardly, said gathering unit comprising laterally and rotatably adjustable divergent extremities adapted to closely engage the ground surface.

3. In a machine of the class specified, a wheeled frame, suction mechanism mounted on the frame, and a tubular gathering unit connected to the suction mechanism and comprising at each side a plurality of laterally and rotatably adjustable divergent gathering extremities adapted to closely engage the ground surface.

4. In a machine of the class specified, a wheeled frame, suction mechanism carried by the frame, and a tubular gathering unit connected to the suction mechanism and comprising at each side a plurality of laterally and rotatably adjustable divergent gathering extremities having a yielding ground-engaging boots.

5. In a machine of the class specified, a wheeled frame, suction mechanism carried by the frame, and a tubular gathering unit connected to the suction mechanism and comprising at each side a plurality of laterally, vertically and rotatably adjustable gathering extremities adapted to closely engage the ground surface.

6. In a machine of the class specified, a wheeled frame, suction mechanism carried by the frame, a tubular unit connected to the suction mechanism and comprising laterally adjustable members each having a plurality of divergent inwardly projected tubular extremities pivotally connected to said laterally adjustable members, and means for laterally adjusting the said members to modify the distances apart of the same and the scope of operation of the unit as a whole relatively to the width of the ground surface over which the unit moves.

7. In a machine of the class specified, a wheeled frame, suction mechanism carried by the frame, a tubular gathering unit connected to the suction mechanism and comprising laterally adjustable members each having a plurality of separated distinct tubular gathering extremities varying in length and means for controlling the separation of the adjustable members to vary the transverse distance between them and correspondingly vary the distance between the gathering extremities thereof to modify the extent of operation of said extremities relatively to the ground surface over which the unit is moved.

8. In a machine of the class specified, a wheeled frame, suction mechanism carried by the frame, and a tubular gathering unit connected to the suction mechanism and comprising laterally adjustable members having a plurality of rotatably adjustable gathering extremities to increase and decrease the scope of operation of the gathering unit relatively to the ground surface over which it moves.

9. In a machine of the class specified, a wheeled frame, suction mechanism carried by the frame, and a tubular gathering unit connected to the suction mechanism and comprising laterally and vertically adjustable members each having a plurality of rotatably adjustable inwardly projecting gathering extremities provided with flexible boots to increase and decrease the scope of operation of the gathering unit relatively to the ground surface over which it moves and effect a close engagement of the gathering extremities with the ground surface.

10. In a machine of the class specified, a wheeled frame, suction mechanism carried by the frame, and a tubular gathering unit comprising laterally adjustable members having a plurality of rotatably adjustable divergent extremities to increase and decrease the scope of operation of the gathering unit relatively to the ground surface over which it moves.

11. In a machine of the class specified, a wheeled frame, suction mechanism carried by the frame, and a tubular gathering unit mounted to have an upwardly and downwardly adjustable swinging movement and comprising laterally adjustable members having a plurality of rotatably adjustable divergent extremities to increase and decrease the scope of operation of the gathering unit relatively to the ground surface over which it moves.

12. In a machine of the class specified, a wheeled frame, suction mechanism carried by the frame and including a separator at the front portion of the frame, a tubular gathering unit mounted on the rear portion of the frame and having a pipe connected to the suction mechanism, the gathering unit having laterally adjustable members each comprising a plurality of inwardly projecting gathering extremities to increase the scope of operation of said members and the unit, and yielding beater means at the front of the frame for striking parts of cotton stalks to remove weevil therefrom, the gathering unit picking up the weevil from the ground surface as the machine progresses.

13. In a machine of the class specified, a wheeled frame, suction mechanism carried by the frame and including a separator, a tubular gathering unit mounted at the rear of the machine and connected to the suction mechanism, and weevil removing devices at the front of the machine consisting of pendant tubular supports having a plurality of heads removably mounted therein and provided with inwardly projecting yielding beating arms.

14. In a machine of the class specified, a wheeled frame, suction mechanism carried by the frame, a tubular gathering unit at the rear of the frame and connected to the suction mechanism, and beater device at the front of the frame comprising pendant tubular supports having slots in their inner portions, a plurality of heads removably mounted in the tubular supports and provided with inwardly extending spring arms, space devices between the said heads, and means applied to the lower ends of the pendant supports for maintaining the spring arms in positive positions relatively to the pendants.

15. A depending jointed suction gathering member for application to an insect destroying machine comprising jointed parts having vertical and divergent extremities to engage the ground surface, the vertical and divergent extremities of the member being rotatable as a unit to vary the position of the same relatively to the machine to which the member may be applied.

In testimony whereof I have hereunto set my hand in presence of two subscribing witnesses.

JOHN B. BROADWELL.

Witnesses:
SOL. F. STRICKLAND,
O. C. SHIRLEY.